US007584064B2

(12) United States Patent
Bonnat

(10) Patent No.: US 7,584,064 B2
(45) Date of Patent: *Sep. 1, 2009

(54) METHOD AND DEVICE TO CONTROL A COMPUTER SYSTEM UTILIZING A FLUID FLOW

(75) Inventor: Pierre Bonnat, Grieges (FR)

(73) Assignee: Inputive Corporation, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/453,192

(22) Filed: Jun. 2, 2003

(65) Prior Publication Data

US 2003/0208334 A1 Nov. 6, 2003

Related U.S. Application Data

(63) Continuation of application No. 09/913,398, filed on Aug. 10, 2001, now Pat. No. 6,574,571.

(51) Int. Cl.
*G01F 1/00* (2006.01)

(52) U.S. Cl. .......... 702/48

(58) Field of Classification Search .......... 702/48, 702/50, 54–56, 100, 104, 45; 345/163, 173; 128/204.23, 204.26; 119/713; 84/727; 250/227.21; 60/538; 73/861.53, 705; 600/595, 532, 529; 180/167

See application file for complete search history.

(56) References Cited

U.S. PATENT DOCUMENTS

| | | | | |
|---|---|---|---|---|
| 4,207,959 | A * | 6/1980 | Youdin et al. | 180/167 |
| 4,433,685 | A * | 2/1984 | Giorgini et al. | 128/204.26 |
| 4,561,309 | A * | 12/1985 | Rosner | 73/705 |
| 4,713,540 | A * | 12/1987 | Gilby et al. | 250/227.21 |
| 4,746,913 | A | 5/1988 | Volta | |
| 4,929,826 | A | 5/1990 | Truchsess et al. | |
| 5,341,133 | A | 8/1994 | Savoy et al. | |
| 5,378,850 | A * | 1/1995 | Tumura | 84/727 |
| 5,422,640 | A | 6/1995 | Haley | |
| 5,603,065 | A | 2/1997 | Baneth | |
| 5,763,792 | A * | 6/1998 | Kullik | 73/861.53 |
| 5,889,511 | A * | 3/1999 | Ong et al. | 345/173 |
| 5,907,318 | A * | 5/1999 | Medina | 345/163 |
| 6,213,955 | B1 * | 4/2001 | Karakasoglu et al. | 600/529 |
| 6,261,238 | B1 * | 7/2001 | Gavriely | 600/532 |
| 6,396,402 | B1 * | 5/2002 | Berger et al. | 340/573.2 |
| 6,574,571 | B1 | 6/2003 | Bonnat | |

FOREIGN PATENT DOCUMENTS

JP 10320108 A * 12/1998

* cited by examiner

*Primary Examiner*—Tung S Lau
*Assistant Examiner*—Xiuquin Sun
(74) *Attorney, Agent, or Firm*—McAndrews, Held & Malloy, Ltd.

(57) ABSTRACT

A device, to facilitate a user control of a computer system, includes a movable portion movable by a fluid flow of a generated by a user of the device, and a converter to convert movement of the movable portion into an electrical signal to facilitate control of the computer system.

18 Claims, 2 Drawing Sheets

METHOD AND DEVICE TO CONTROL A COMPUTER SYSTEM UTILIZING A FLUID FLOW

The present application is a continuation of application Ser. No. 09/913,398 filed Aug. 10, 2001 now U.S. Pat. No. 6,574,571.

FIELD OF THE INVENTION

The invention concerns the technical field for of controlling an electronic or computer systems.

BACKGROUND OF THE INVENTION

A device known as a mouse is used for transforming movements into controls required by a user. The mouse is formed by a box equipped with electronic means connected to the computer for transforming the movements of the box on the working surface into a movement of the cursor or pointer on the computer screen.

Thus, a mouse more generally includes a ball for rolling over the working surface, sensors to detect the movements of the ball and means for processing the electric signals of the sensors. The processing means are connected to the computer by an electric cable or a Hertzien or infrared link. The processing means have been designed to deliver signals recognised by the protocol of the port to which the mouse is connected, usually corresponding to the standard RS 232. However, the mouse can also be connected to the computer via a dedicated interface card or to a specific bus in which case the processing means shall deliver one or several signals recognised by the protocol associated with this interface card or bus.

The mouse may in addition include a certain number of push or scrolling buttons which are also connected to the processing means and which correspond to validation or data entry function according to the operating mode of the computer.

The means for processing the signals derived from the movement sensors and the position sensors of the scrolling or input buttons then provide several principal functions, namely:

detection of the movement of the mouse, detection of the position of the push-buttons, and communication with the computer as per the retained standard.

Communication with the microcomputer is more usually managed by a microprocessor ensuring the two parts of the processing of the signals derived from the movement and position detectors of the push-buttons. The mouse also contains means to control the electric feeding of the means for processing the signals and possibly that of the movement detection and position sensors.

Finally, the mouse is associated with a control software loaded into the computer which decodes the signal transmitted by the mouse. The driver provides the application software requesting it information concerning the state and status of the mouse: firstly the movement and secondly the position of the push-buttons so as to enable them to carry out the resultant actions.

In its most frequently used operating mode, the driver communicates with the sub-programme or movement routine of the cursor or pointer when the mouse is moved and sends messages to the programme when the push-buttons of the mouse are pressed.

It ought to be said that for most of the drivers used, the movement of the pointer on the screen does not correspond directly to that of the mouse. In fact, it has been observed that the movement of the mouse can be broken down into two main movements, namely movement of the mouse until the pointer is brought into the desired zone and then its precise positioning on the targeted point or object. Thus, when the mouse is moved slowly, the driver generates a movement of the pointer on the screen of about 100 CPI (Counts Per Inch) or DPI (Dots Per Inch), and when the mouse is moved quickly, the driver generates a movement of the pointer of about 400 CPI, indeed 1000 CPI.

According to the prior art, the mouse gives full satisfaction as a control peripheral of a computer when using the hand.

However, it may appear necessary to be able to control a computer or electronic system without resorting to using the hands, especially when the user is unable to do so.

SUMMARY OF THE INVENTION

According to one aspect of the present invention, there is provided a device to facilitate a user control of a computer system. The device includes a movable portion movable by a fluid flow of a generated by a user of the device, and a converter to convert movement of the movable portion into an electrical signal to facilitate control of the computer system.

Various other characteristics appear in the following description with reference to the accompanying drawings which show by way of non-restrictive examples the embodiments of the object of the invention.

DETAILED DESCRIPTION

Figure 1:
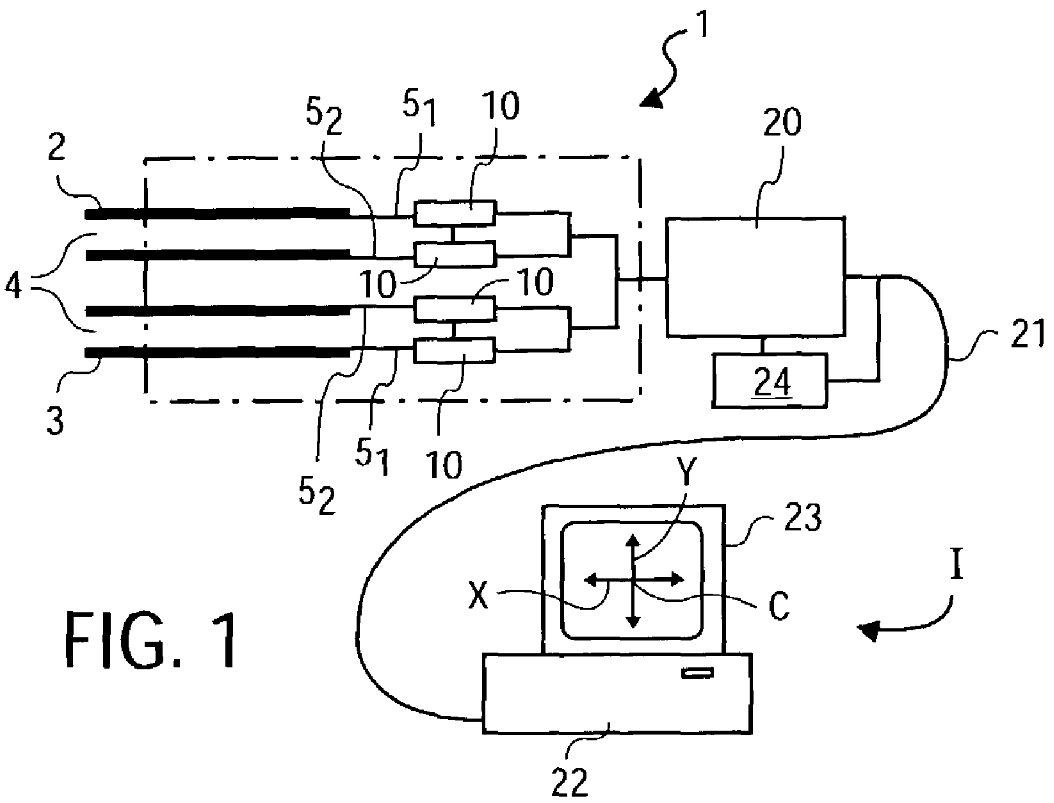
FIG. 1 is a diagrammatic view of a preferred embodiment of a device conforming to the invention for monitoring the movement of a pointer on a computer
Figure 2:
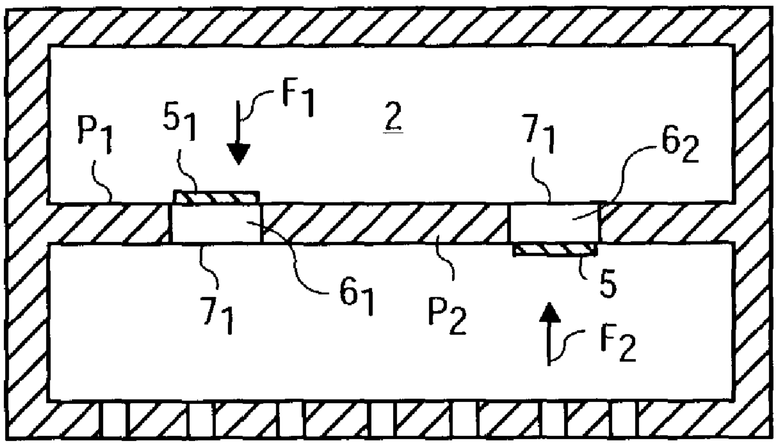
FIG. 2 is a diagrammatic section showing details of the arrangement of the vibrating segments for a monitoring device conforming to the invention.

FIG. 1 diagrammatically illustrates an application example of the invention for a device denoted in its entirety by the reference 1 controlled by the breath of a user for moving the cursor C of a computer system 1.

The monitoring device 1 comprises two tubes 2, 3 associated with a movement direction X or Y of the cursor. Each tube 2, 3 has an orifice 4 at the level of which an individual can breathe in or suck up air. Opposite the orifices 4, each tube 2, 3 has two free segments, one $\mathbf{5}_1$ of the latter being stressed by the air expired or on expiration, whereas the other $\mathbf{5}_2$ is stressed by the inspired air or on inspiration.

As shown on FIG. 1, each segment $\mathbf{5}_1$ and $\mathbf{5}_2$ is mounted opposite a channel 61 and $\mathbf{6}_2$ fitted in the wall of the tube 2 or 3. Each channel $\mathbf{6}_1$, $\mathbf{6}_2$ has dimensions similar to the dimension of the associated segment whilst being slightly larger so that the segment can flap in the channel. So as to ensure vibrating of each of the segments $\mathbf{5}_1$, $\mathbf{5}_2$ by its corresponding stress breath, each segment is placed so as to be flush with the plane $P_1$ or $P_2$ of the wall of the tube 2 situated upstream with respect to the direction of the expiration flow $F_1$ or $F_2$ for stressing said segment. Thus the segment 51, which needs to be stressed by the expiration flow $F_1$, is flush with the plane $P_1$ inside the tube 2, whereas the segment $\mathbf{5}_2$ needing to stressed by the inspiration flow $F_2$ is flush with the plane $P_2$ outside the tube.

Similarly, so as to provide improved stressing of the segments, each channel $\mathbf{6}_1$, $\mathbf{6}_2$ is preferably, but not necessarily, associated with a non-return clack valve $\mathbf{7}_1$ or $\mathbf{7}_2$ allowing only air to pass in the stress direction of the corresponding segment $\mathbf{5}_1$ or $\mathbf{5}_2$.

Each segment $\mathbf{5}_1$, $\mathbf{5}_2$ of each tube 2, 3 is associated with a conversion device 10 directly transforming the mechanical vibrations of the segment into an electric signal.

Figure 3:
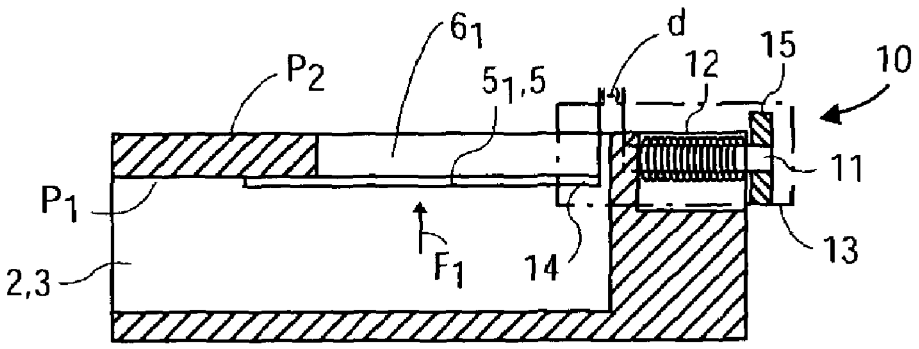
FIG. 3 shows a device for the electromagnetic conversion of the vibrations of a free segment into an electric signal.

According to a preferred embodiment of the invention, these conversion means 10 are, as shown on FIG. 3, formed by an electromagnetic transducer including a magnet 11 and a transducing coil 12 associated with a magnetic circuit 13 symbolised by the dot-and-dash lines. This magnetic circuit includes a ferromagnetic portion presented by the segment 5 at the level of its free extremity 14. The free segment 5 is preferably fully made of a plastic material and an element or ferromagnetic coating is mounted on its extremity. Of course, the segment could be fully made of a ferromagnetic material.

The material constituting the segment 5 has been selected so as to induce a rapid damping of the vibrations of the segment at the end of stressing. In this respect, it needs to be noted that for the choice of this material, the most important criterion is the capacity of the segment to be vibrated under the action of a fluid flow and more particularly a flow of air.

So as to avoid disturbing the functioning of the electromagnetic transducers 10 associated with the free segments $\mathbf{5}_1$, $\mathbf{5}_2$, the body of the monitoring device is preferably embodied, but not exclusively, inside an amagnetic material and preferably in a synthetic material, such as an injected plastic material or even a moulded composite material. Moreover, the use of these materials, depending on their implementation conditions, can render the device 1 silent.

According to a preferred, but not exclusive, embodiment, each conversion device 10 includes a mobile adjustment element 15 for coming opposite the segments 5 so allow for an adjustment of the distance d, namely an air gap, separating the foot of the mobile element 15 from the free extremity 14 of the segment 5. According to the example shown, the mobile adjusting element is constituted by a screw forming the core of the transducing coil 1 and extending along a direction approximately parallel to the extension plane of the segment 5.

Each conversion device 11 functions as follows. When a segment 5 is stressed on vibration by a flow of air circulating in the conduit 2 or 3, it starts to vibrate so that the movements of its free extremity 14 disturb the magnetic field generated by the magnet 11 and routed by the magnetic circuit 13. These vibrations then induce an electromotive force in the coil 12. This variable electromotive force creates a current, the oscillations of the latter being the electric image of the mechanical oscillations of the vibrating free segment 5. The electric signal generated by each conversion device 10 is then amplified and/or processed by a processing system 20.

The processing system 20 is connected by a line 21 to an interface with a computer 22 comprising a display screen 23.

The processing system 20 includes the power electronics and a microprocessor able to process the signals derived from the conversion devices 10 so as to condition them according to a specific standard or protocol.

Therefore, if it is decided to connect the device 1 to a mouse port functioning according to the standard RS 232, the system 20 shall then process the signals so as to translate them into this standard. Of course, any other dialogue standard could be adopted according to the nature of the computer system 1.

The system 20 is fed appropriately and, in the case of the use of an RS 232 standard interface, by an auxiliary power source 24 which uses the electric current available at the level of the interface.

The monitoring device 1 thus established may function as follows.

When the user of the computer wishes to control movement along the direction X of the cursor C on the screen 23, he blows into or breathes out in the first tube 2 for example so as to stress on vibration the segment $\mathbf{5}_1$ of this tube. The characteristics of the signal transmitted by the conversion device 10 associated with this segment $\mathbf{5}_1$ then directly depend on the intensity of the blow. The system 20 for processing the electric signal then converts the analog signal derived from the device 10 into a digital signal transmitted by the line 21 to an interface of the computer 22. The system 20 may for example, but not necessarily, process the signal so as to associate value thresholds and/or conversion ratios to the information received from the conversion devices 10. This signal is then interpreted by a Driver programme functioning on the computer 22 into a movement of the cursor C along the direction X towards the right, for example. The movement speed of the cursor C could then directly depend on the intensity of the blowing applied.

When the user sucks up or breathes through the same tube 2, the segment 5 stressed on inspiration shall activate its associated conversion device 10 which shall transmit an electric signal which, after processing by the system 20, could be translated by the interface and the software of the computer 58 into a movement along the direction X towards the left of the cursor C. As previously, the movement speed of the cursor shall depend on the intensity of suction.

Similarly, the fact of breathing out or in through the second tube 3 shall be associated with a movement of the cursor C along the direction Y either upwards or downwards.

The associated Driver of the device 1 could then allow allocation of the tubes 1 and 2 to the movement directions of the cursor C, as well as the movement directions of the cursor C associated on inspiration and expiration.

According to one embodiment variant of the device 1, each segment $\mathbf{5}_1$, $\mathbf{5}_2$ is associated with means for damping its vibrations at the end of stressing so as to guarantee great precision of control of the cursor C.

In accordance with the invention, it appears that the monitoring device 1 is able to obtain functioning of the computer system 22, 23 directly subordinate to or controlled by the breath of a user. The invention then makes it possible to advantageously control an improved computer system by a user who would have lost use of his upper limbs, for example.

So as to have functions similar to those of a conventional mouse, the device 1 of the invention may also include systems of buttons to be activated by pressing one of the buttons.

These systems may be formed by a mobile portion of the orifice which activates a switch when it is pressed from above or is moved from one side to the other.

The breath pointing device may also include an additional conduit including a single free segment 5 associated with a conversion device 10 so as to constitute a monitoring device having a function similar to that of the function button, namely "scroll" present on certain mice make use of a menu.

Of course, this is only one example of one of the possible applications of the invention for monitoring a computer or electronic system.

In fact, the conversion of the vibrations of a free segment into an electric signal can be used for any other computer action than moving of the cursor.

Similarly, the fluid current in the example above is sucked in or breathed out air, but it could also be an air current applied in a suitable way, such as by means of bellows, a blower or a compressed gas reserve or similar element. Equally it could be possible to use another fluid, gas or liquid, for generating vibrations of the segment.

In the examples above, the means for converting movements of the free segment into an electric signal are constituted by an electromagnetic transducing system.

However, in accordance with the invention, the conversion for movements of the free segment into an electric signal could be made in any other way, such as by opto-electronic means formed by the association of a light source and a sensor placed so that the vibrations of the segment creates an interference with the illumination of the sensor.

Figure 4:
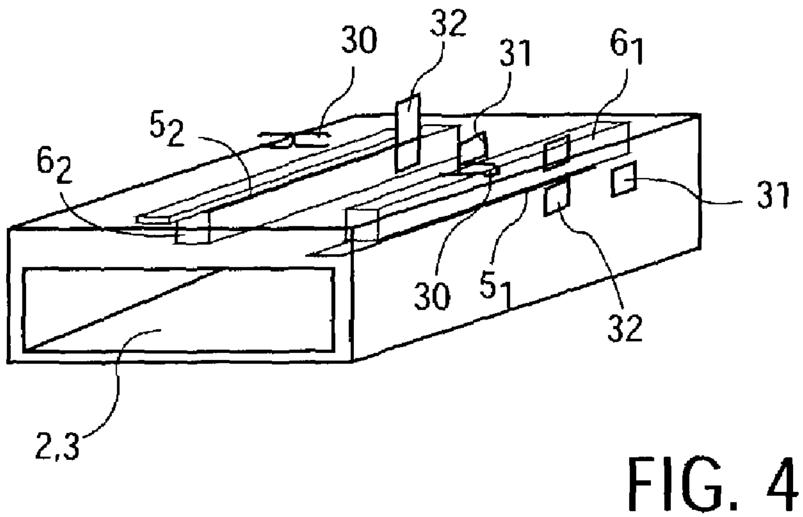
FIG. 4 shows a device for the opto-electronic conversion of the vibrations of a free segment into an electric signal.

Thus, according to one embodiment variant of the invention and shown on FIG. 4, the conversion means are formed for each segment by a light source 30 and a light sensor 31 placed opposite each other and on both sides of the free segment.

Thus, when the segment is stressed on vibration by the breath of the user, its free extremity placed between the corresponding light source and the sensor generates a discontinuous illumination of the sensor so as to create a variable electric signal which shall be processed by the processing system 20 of the monitoring device of the invention, as described previously.

The light source 20 is preferably formed by a light-emitting diode (LED) and the sensor 31 is formed by a phototransistor. So as to avoid daylight disturbing the detection of the vibrations of the segment, the conversion device works in infrared. Similarly, a dark zone is provided close to the light source and sensor. Of course, it is also possible to use a photo-resistor as a light sensor.

So as to increase the surface area of the segment placed between the sensor 31 and the light source 30, the free extremity of the segment may bear a screen 32 for hiding the light source with respect to the sensor in certain positions of the segment and more particularly when the latter is inactive. It is also possible to provide a window, either in the segment or in the screen, so as to clearly determine the positions of said segment in which the light ray reaches the sensor 31.

It could also be possible to adapt the light-emitting diode 30 at the free extremity of the segment and place a window in front of the phototransistor so as to reduce its optical opening. The feeding of the diode 30 can then be carried out with the aid of sliding contacts co-operating with one or two conductive ranges so as to feed the diode solely when it moves in front of the sensor 31.

Figure 5:
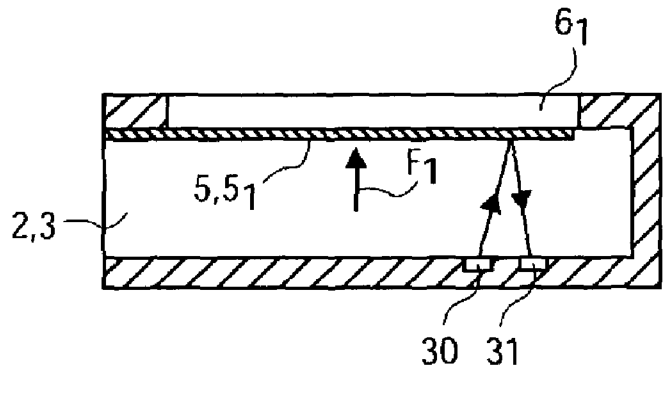
FIG. 5 shows another embodiment variant of a device for the opto-electronic conversion of the vibrations of a free segment into an electric signal.

According to another variant shown on FIG. 5, the extremity of one of the faces of the free segment 5 is covered with a coating reflecting the light emitted by the light source 30.

The light sensor 31 is then placed so as to receive in its rest position the segment 5 and via reflection onto the segment 5 the light emitted by the source 30. When the segment vibrates, the reflected light is deflected so that it no longer fully reaches the sensor 31. The light intensity received by the sensor 31 thus varies and the movement of the segment 5 is therefore converted into an electric signal.

Of course, it is also possible to convert the movements of the free segment into an electric signal by other conversion means, such as with the aid of a piezo-electric sensor integral with the segment, this sensor then being connected to the processing system 20 of the monitoring device.

In the examples above, the means for converting the movements of the free segment into an electric signal are used for monitoring a computer system, but they could also be used for monitoring any other electronic system and especially within the context of an electric musical instrument, such as a free reed instrument.

What is claimed is:

1. A method comprising:

converting each of first and second movements of at least one movable portion of a user input device into at least one electrical signal utilizing at least one conversion device, each of the first and second movements of the at least one movable portion of the user input device caused by fluid flow generated by a user; and controlling first and second actions of an item viewable on a screen, the first and second actions of the item being directly responsive, respectively, to the first and second movements of the at least one movable portion of the user input device, wherein the first and second actions are proportional to the fluid flow generated by the user, wherein the first action comprises movement of the item along a first direction on the screen, and wherein the second action comprises movement of the item along a second direction on the screen.

2. The method of claim 1, wherein the movement of the at least one movable portion is a vibrating movement.

3. The method of claim 1, wherein the at least one movable portion is at least one segment movably secured to the user input device.

4. The method of claim 1, wherein the flow of the fluid is generated from one or both of inspiration and/or expiration by the user.

5. The method of claim 1, wherein the at least one electrical signal is to provide a user input to a user interface of a computer system.

6. A device comprising:

at least one movable portion movable by fluid flow generated by a user of the device, at least one converter to convert each of first and second movements of the at least one movable portion into at least one electrical signal; and an interface to translate the at least one electrical signal, the translated at least one electrical signal controlling first and second actions of an item viewable on a screen, the first and second actions of the item being directly responsive, respectively, to the first and second movements of the at least one movable portion, wherein the first and second actions are proportional to the fluid flow generated by the user, wherein the first action comprises movement of the item along a first direction on the screen, and wherein the second action comprises movement of the item along a second direction on the screen.

7. The device of claim 6, comprising at least one fluid channel to carry the fluid flow, and wherein the at least one movable portion is secured so as to be movable by the fluid flow through the at least one fluid channel.

8. The device of claim 6, wherein the at least one converter comprises a piezo-electric transducer.

9. The device of claim 6, wherein the at least one converter comprises an electromagnetic transducer.

10. The device of claim 6, wherein the device comprises at least one light sensor arranged relative to the at least one movable portion so that the movement of the at least one movable portion disturbs illumination of the at least one light sensor.

11. The device of claim 10, wherein the device comprises at least one light source arranged to illuminate the light sensor.

12. The device of claim 6, wherein the at least one moveable portion comprises first and second movable portions, and further comprises a body defining first and second fluid channels, the first and second movable portions being in fluid communication with the first and second fluid channels respectively so that a first fluid flow within the first fluid channel causes movement of the first movable portion and a second fluid flow within the second fluid channel causes movement of the second movable portion.

13. The device of claim 12, wherein the at least one converter comprises a first converter to convert the movement of the first movable portion into a first electrical signal, and a second converter to convert the movement of the second movable portion into a second electrical signal, the first and second electrical signals comprising different control signals for input to a computer system.

14. The device of claim 13, wherein the first and second electrical signals are to control movement of a cursor of a user machine.

15. The device of claim 6, comprising a processor to process the at least one electrical signal so as to conform the at least one electrical signal to a specific protocol.

16. The device of claim 6, comprising at least one damper to dampen the movement of the at least one movable portion.

17. A method to interact with a graphical user interface, the method comprising:

converting each of first and second movements of at least one movable portion of a user input device into at least one electrical signal utilizing at least one conversion device, each of the first and second movements of the at least one movable portion of the user input device responsive to fluid flow generated by a user; and performing first and second actions of an item associated with the graphical user interface responsive to the at least one electrical signal, the first and second actions being directly responsive, respectively, to the first and second movements, wherein the first and second actions are proportional to the fluid flow generated by the user.

18. The method of claim 17, wherein each of the first and second actions comprises:

moving a pointer for interaction with the graphical user interface to identify a selectable action; and selectively executing the selected action based on further movement of the at least one movable portion.

* * * * *